(12) United States Patent
Hakola et al.

(10) Patent No.: US 8,744,458 B2
(45) Date of Patent: Jun. 3, 2014

(54) SIGNALING MIXED RESOURCE ALLOCATIONS FOR D2D COMMUNICATIONS

(75) Inventors: Sami-Jukka Hakola, Kempele (FI); Timo K. Koskela, Oulu (FI); Vinh V. Phan, Oulu (FI)

(73) Assignee: Nokia Corporation, Espoo (FI)

( * ) Notice: Subject to any disclaimer, the term of this patent is extended or adjusted under 35 U.S.C. 154(b) by 398 days.

(21) Appl. No.: 12/927,658

(22) Filed: Nov. 19, 2010

(65) Prior Publication Data

US 2012/0129540 A1    May 24, 2012

(51) Int. Cl.
*H04W 72/04* (2009.01)

(52) U.S. Cl.
USPC ..... 455/450; 455/425; 455/452.1; 455/452.2; 455/411

(58) Field of Classification Search
USPC ............. 455/450, 425, 411, 452.2, 502, 63.1, 455/522; 370/338, 331, 335
See application file for complete search history.

(56) References Cited

U.S. PATENT DOCUMENTS

| | | | |
|---|---|---|---|
| 2005/0239451 A1* | 10/2005 | Periyalwar et al. | 455/425 |
| 2009/0011770 A1* | 1/2009 | Jung et al. | 455/452.1 |
| 2010/0093364 A1 | 4/2010 | Ribeiro et al. | 455/452.2 |
| 2011/0300892 A1 | 12/2011 | Hakola et al. | 455/512 |
| 2011/0306349 A1 | 12/2011 | Hakola et al. | 455/450 |
| 2012/0030358 A1* | 2/2012 | MacKenzie | 709/226 |

FOREIGN PATENT DOCUMENTS

| | | |
|---|---|---|
| WO | WO-2009138820 A1 | 11/2009 |
| WO | WO-2010082114 A1 | 7/2010 |
| WO | WO-2011085810 A1 | 7/2011 |
| WO | WO-2011098128 A1 | 8/2011 |
| WO | WO-2011109941 A1 | 9/2011 |
| WO | WO-2011116815 A1 | 9/2011 |
| WO | WO-2011032896 A2 | 10/2011 |

OTHER PUBLICATIONS

Laroia, Rajiv, "Future of Wireless? The Proximate Internet", COMSNETS, Jan. 7, 2010, 38 pgs.
Doppler, et al. "Device-to-Device Communications as an Underlay to LTE-Advanced Networks—Topics in Radio Communications," *IEEE Communications magazine*, Dec. 2009 pp. 42-49.

* cited by examiner

*Primary Examiner* — Jinsong Hu
*Assistant Examiner* — Jean Chang
(74) *Attorney, Agent, or Firm* — Harrington & Smith

(57) ABSTRACT

In an embodiment, for a case in which there is an active connection established between a cellular network and a user equipment UE and the UE has simultaneously an active connection within a local network distinct from the cellular network, there is an indication within a resource allocation message communicated between the cellular network and the UE which is used to identify whether a radio resource allocated by the resource allocation message is for the cellular network or for the local network. In various embodiments, the local network is a D2D network and the message is directed to a C-RNTI associated with the D2D network; and/or a value of the indication identifies the allocated radio resource as an allocation for the D2D network or for the cellular network and also whether the allocation is to the UE or to a paired D2D device or to both.

16 Claims, 4 Drawing Sheets

SIGNALING MIXED RESOURCE ALLOCATIONS FOR D2D COMMUNICATIONS

TECHNICAL FIELD

The exemplary and non-limiting embodiments of this invention relate generally to wireless communication systems, methods, devices and computer programs and, more specifically, relate to resource allocations for user devices operating in heterogeneous networks (e.g., combined cellular and D2D networks).

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| C-RNTI | cell radio network temporary identifier |
| CCE | control channel element |
| CQI | channel quality indicator |
| D2D | device to device (sometimes termed machine to machine M2M or peer-to-peer P2P) |
| DCI | downlink control information |
| DL | downlink (eNB towards UE) |
| eNB | E-UTRAN Node B (evolved Node B) |
| E-UTRAN | evolved UTRAN |
| LTE/LTE-A | long term evolution/long term evolution-advanced |
| MME | mobility management entity |
| PDCCH | physical downlink control channel |
| PDSCH | physical downlink shared channel |
| PRB | physical resource block |
| PUSCH | physical uplink shared channel |
| RRC | radio resource control |
| SC-FDMA | single carrier frequency-division multiple access |
| SR | scheduling request |
| TTI | transmission time interval |
| UE | user equipment |
| UL | uplink (UE towards eNB) |
| UTRAN | universal terrestrial radio access network |

Research is ongoing for integrating new wireless network topologies under the umbrella of existing and evolving cellular wireless systems, as opposed to side by side such as WLAN co-existing with cellular. Such integrated networks are generally termed a heterogeneous network, and by example current development of 3GPP LTE/LTE-A systems are to deploy macro, micro, pico, and femto cells (as well as relay nodes) in the same spectrum being used by the LTE/LTE-A cellular signaling system, but under supervision of the LTE/LTE-A network. In one aspect such deployed cells include local networks of user devices communicating directly with one another in a D2D network, without routing through the cellular infrastructure.

In various implementations the cellular network's supervision can take on different levels and may allow autonomous or semi-autonomous D2D communication. The local D2D terminals may perform certain tasks in a co-operative way, such as spectrum sensing to find temporarily unused portions of the licensed cellular spectrum for their own D2D communications or co-operative downloading or multicasting. One D2D terminal may serve as a gateway for other low-capability devices to access the cellular network.

For simplicity of description only assume there are only two communicating devices forming a D2D network. This D2D network may be given its own temporary identifier (C-RNTI) so that each of the D2D pair can know from a single control message sent by the cellular network (eNB) what radio links/bearers are allocated for their D2D communications. It is reasonable to assume that in some instances the D2D bearer may be allocated by the eNB semi-persistently, to limit control signaling overhead. Conventionally, a user device UE in a cellular network is assigned an individual C-RNTI by which it identifies its individual (cellular) resource allocations. Combining this with the C-RNTI for the D2D network means that a UE operating in both cellular and D2D networks has two C-RNTIs for which to monitor what radio resources the network has allocated to it. In LTE the resource allocations are sent on the PDCCH, and so the above scenario leads to the following issues.

First, there are different PDCCH message required for cellular and D2D radio bearers per TTI if the eNB is to allocate cellular resources and D2D resources to the same UE. This complicates the mapping of PDCCHs to CCE locations respecting the device specific search spaces. Second, the UE will need to search at least for its individual cellular C-RNTI and its D2D-pair C-RNTI. But if the other UE of the D2D pair also has an active cellular link then still the first UE's extended searching might not identify all collisions which might impact the allocated D2D bearers, since the other D2D device might have received an allocation under its individual C-RNTI which the first UE never reads. The eNB can itself assure by its own scheduling that it allocates no overlapping resources, but that constrains the eNB's scheduling flexibility. Maximizing the eNB's scheduling flexibility in the above scenario would result in the power-limited UEs routinely searching multiple search spaces for the various c-RNTIs and still not positively identifying all potential D2D bearer collisions.

Assuming a straightforward extension of LTE practices for the above scenario, the eNB would allocate cellular resources for UL transmissions using DCI Format 0 on the PDCCH using the individual cellular C-RNTIs, and allocate resources for D2D transmissions using DCI Format 0 (or some new DCI format) on the PDCCH using the C-RNTI assigned to the D2D pair. As detailed below the inventors have derived a signaling regimen to support resource allocations for both cellular and D2D links for the UEs in active D2D communication that is more efficient than the above extension of LTE practices, and which embodiments enable the D2D devices to positively identify bearer collisions in all cases.

SUMMARY

The foregoing and other problems are overcome, and other advantages are realized, by the use of the exemplary embodiments of this invention.

In a first aspect thereof the exemplary embodiments of this invention provide a method comprising: establishing an active connection between a cellular network and a user equipment, in which the user equipment has simultaneously an active connection within a local network distinct from the cellular network; and using an indication within a resource allocation message communicated between the cellular network and the user equipment to identify whether a radio resource allocated by the resource allocation message is for the cellular network or for the local network. In an embodiment the indication is explicit.

In a second aspect thereof the exemplary embodiments of this invention provide an apparatus comprising at least one processor and at least one memory storing computer program code. The at least one memory and the computer program code are configured, with the at least one processor, to cause the apparatus at least to: establish an active connection between a cellular network and a user equipment, in which the user equipment has simultaneously an active connection within a local network distinct from the cellular network; and use an indication within a resource allocation message communicated between the cellular network and the user equipment to identify whether a radio resource allocated by the resource allocation message is for the cellular network or for the local network. In an embodiment the indication is explicit.

In a third aspect thereof the exemplary embodiments of this invention provide a computer program product comprising a non-transient computer-readable memory bearing computer program code embodied therein for use with at least one processor. The computer program code comprises code for establishing an active connection between a cellular network and a user equipment, in which the user equipment has simultaneously an active connection within a local network distinct from the cellular network; and also code for using an indication within a resource allocation message communicated between the cellular network and the user equipment to identify whether a radio resource allocated by the resource allocation message is for the cellular network or for the local network. In an embodiment the indication is explicit.

In a fourth aspect thereof the exemplary embodiments of this invention provide an apparatus comprising storing means and mapping means. The storing means is for storing different values for an indication each associated with a different meaning for a resource allocation. The mapping means is for identifying, with reference to the storing means and to a specific value of an indication within a resource allocation message, whether a radio resource allocated by the resource allocation message is for a cellular network or for a local network distinct from the cellular network.

DETAILED DESCRIPTION

Figure 1:
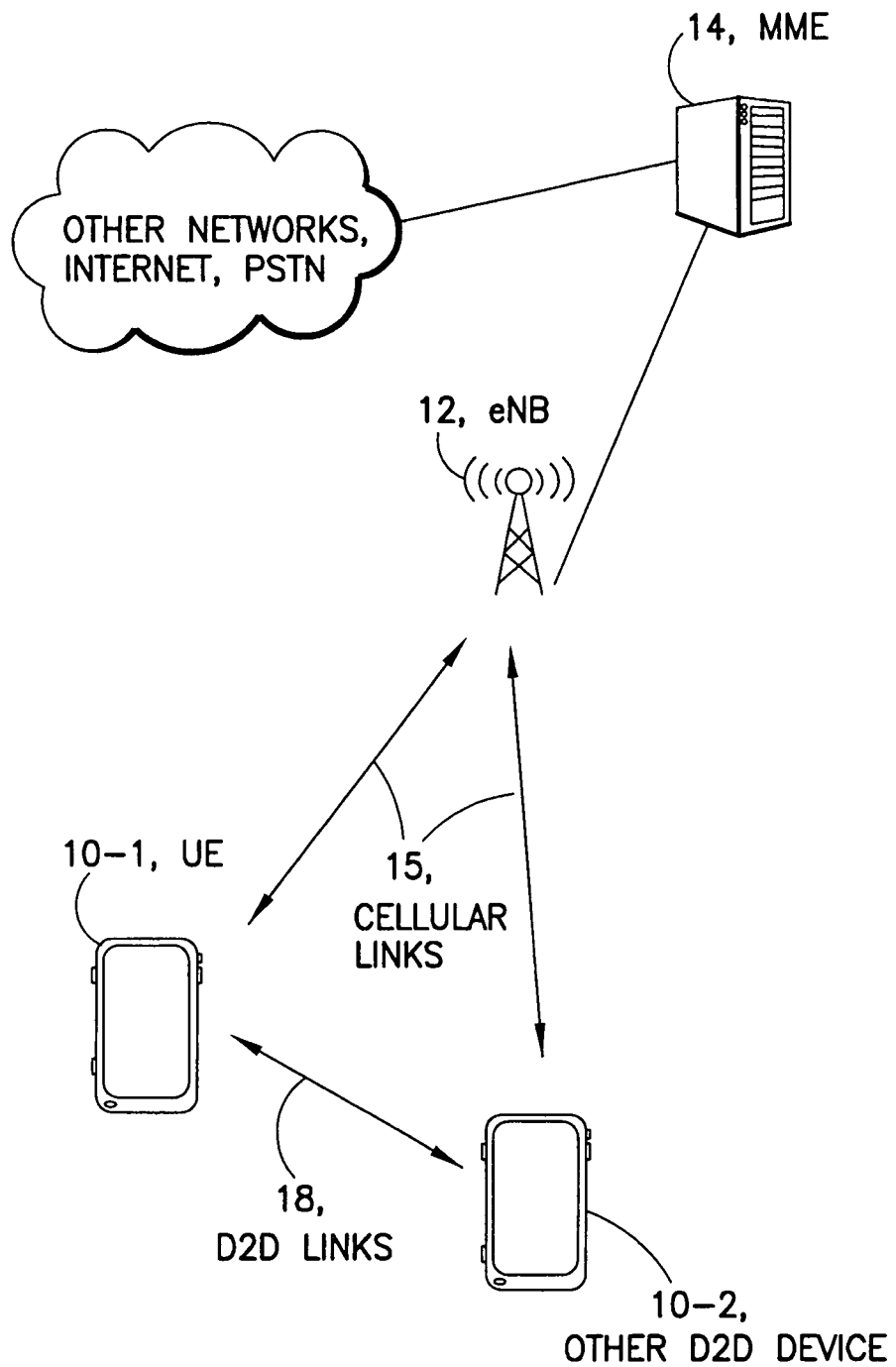
FIG. 1 illustrates various devices including user devices operating in both a D2D and a cellular network and two nodes of the cellular network itself as an exemplary environment in which exemplary embodiments of the invention may be practiced to advantage.

FIG. 1 illustrates a high level schematic diagram of a D2D network of devices (two shown) operating under control of a cellular network represented as an access node or eNB. This heterogeneous network is an exemplary environment in which exemplary embodiments of the invention may be used to advantage. This description utilizes LTE-specific terminology to provide a specific example of one possible environment as well as implementation details for how these teachings might be put into practice, but these specific examples are not limiting to the broader teachings presented herein and claimed below; other cellular type networks in which these teachings may be deployed with advantage include systems such as for example high speed data packet access HSDPA, wideband code division multiple access WCDMA, and global system for mobile communication GSM (including its variances GERAN and EDGE).

The cellular network by example includes an MME 14 and the eNBs which it controls, and other nodes not specified at FIG. 1. The MME 14 provides connectivity to other networks and nodes, including by example other nodes within the same cellular network (home and visiting registers, authentication and authorization servers, etc.), other cellular networks, the Internet and publicly switched telephone networks PSTNs. In LTE the eNBs autonomously schedule the radio resources for their own cell without direction from the MME 14 directly.

There is a D2D cluster or network operating within the cellular network cell that is controlled by the eNB 12. In this cluster there is a UE 10-1 and another device 10-2 which may be another UE but is termed differently for clarity. FIG. 1 illustrates only two devices within the D2D cluster though the principles detailed below are readily extended to D2D clusters/networks with more than two devices. The eNB 12 assigns a C-RNTI to the D2D network, which is not an individual assignment but instead a means by which the eNB 12 can signal all members of the D2D network in one DL message rather than sending them each individual messages. It is generally understood that the D2D members are to register with the eNB 12 as D2D members so the eNB 12 may more efficiently manage the radio resources it controls.

Conventionally the eNB 12 assigns a C-RNTI to the individual UE 10-1 which is active in the cellular system, and also a different C-RNTI to the other device 10-2 if that device 10-2 is also active in the cellular network. Active in this regard does not mean actively communicating user data UL and DL, but simply registered with the eNB 12 and assigned a C-RNTI for paging or resource allocation purposes. The UE 10-1 and other device 10-2 may for example become active in the cellular network by handing over from another eNB, or from establishing themselves with the eNB 12 via a random access procedure. In certain exemplary embodiments of the invention the UE 10-1 and/or the other device 10-2 may not be assigned an individual C-RNTI for their resource allocations but instead utilize only a C-RNTI associated with their D2D network as a network for all their resource assignments, as will be detailed below. Other embodiments retain the individual C-RNTI assignment, as is also detailed below in those same and in other embodiments. The UE 10-1 and other device 10-2 may for example become active in the D2D network by registering as D2D users with the eNB 12, or by monitoring PDCCHs for the C-RNTI assigned to the D2D network.

Cellular links 15 include the PDCCH on which the eNB 12 sends all resource assignments, as well as the PUSCH and PDSCH on which the user data is sent on the allocated resources. D2D links 18 include only those allocated for the inter-D2D communications between the UE 10-1 and the other device 10-2. It is assumed that at least some of the allocations for the D2D links 18 are to be semi-persistent, that is, the same radio resource is allocated in one PDCCH allocation but the allocation persists across a finite number of two or more TTIs. Alternatively the D2D allocation may be persistent, which continues indefinitely until the eNB revokes the persistent allocation or the D2D network dissolves or disperses.

Conventionally the eNB 12 would send a resource allocation for the PDSCH and/or the PDSCH on a PDCCH addressed to the individual C-RNTI. Given that the D2D network is also assigned its own C-RNTI then as noted in background above the eNB 12 might send an allocation for the D2D links 18 on a PDCCH addressed to the D2D C-RNTI. But this invites the adverse issues noted in the background section above.

Instead, according to exemplary embodiments detailed further below the eNB 12 sends a resource allocation message (e.g., a PDCCH) which carries a resource allocation for either the cellular bearer 15 or the D2D bearer 18, and there is in this same resource allocation message an indication whether the allocation is for the cellular network (bearer 15) or for the D2D network (bearer 18). The advantage from the UE perspective are most pronounced for the case in which the UE 10-1 is active in both the cellular and D2D networks, since in that instance the indication of cellular 15 or D2D 18 bearer has meaning to the UE. In the specific but non-limiting examples below this indication in the resource allocation message is explicit, but other implementations may use an implicit indication.

In an exemplary embodiment such a PDCCH is addressed to the C-RNTI assigned to the D2D network. For this reason the UE 10-1 which is active in both cellular and D2D networks need not be assigned an individual C-RNTI for so long as it remains active in the D2D network, since that UE 10-1 may get either its cellular or its D2D allocation in any given PDCCH, with the distinction given explicitly by the indication in that same resource allocation message. Note that a given PDCCH may carry multiple resource allocation messages as is known in the LTE system, and so one PDCCH may carry a first resource allocation and a first indication for the cellular network/bearer 15 and also a second resource allocation and a second indication for the D2D network/bearer 18.

Resource allocations in LTE are signaled in one of several different DCI formats. For the case in which the resource allocation is for a cellular link and is allocated to for both devices, in an exemplary embodiment the eNB 12 concatenates for example two DCI Format 0 messages for signaling to both devices 10-1, 10-2. By example the eNB 12 can indicate that there are concatenated messages with an additional bit or bit sequence placed at the beginning of the DCI message. Alternatively the eNB 12 may indicate that there are concatenated messages by utilizing a pre-arranged pattern of padding bits after the first of the two concatenated DCI messages.

The UE 10-1 and the other device 10-2 receive the DCI message and recognize it is directed to them from the D2D C-RNTI within it. Each of the D2D devices 10-1, 10-2 then reads a value for the explicit indication bits and looks up the meaning of that bit value from a table or other data arrangement stored in their respective local memory that associates the different bit values to their predefined resource allocation meaning. Alternatively they may similarly look up a meaning for the implicit indication.

Below are specific examples of how those bit values might be associated with different resource allocation meaning. In these examples the explicit indication is two bits but in other exemplary embodiments it may be more or less than two. By example, if there is only one bit for signaling the indication that bit may select between the D2D network and the cellular network, with some default meaning that the resource allocation is to the cluster head (UE 10-1) for the case in which the indication is that the allocation for the cellular network.

In a first example there is a two-bit explicit resource allocation indication which has the meanings given in the table below (bit values may be changed in other embodiments).

| bit value | resource allocation meaning |
|---|---|
| 00 | allocation is for the D2D network |
| 01 | allocation is to the UE 10-1 for the cellular network |
| 10 | allocation is to the other (device 10-2 for the cellular network |
| 11 | allocation is to both the UE 10-1 and to the other device 10-2 for the cellular network |

For this first example, for the case in which the bit value has the meaning that the resource allocation is for the D2D network (bit value 00 in the above table), then in an exemplary embodiment at least the following fields are included in the resource allocation message: resource block grant; allocation type (e.g., dynamic or persistent or semi-persistent), a power control command, and a request for the D2D devices 10-1, 10-2 to send aperiodic CQI reports about the D2D link.

Still for this first example, for the case in which the bit value has the meaning that the resource allocation is for only one of the devices 10-1, 10-2 for the cellular network (bit values 01 or 10 in the above table), then in an exemplary embodiment the conventional LTE DCI Format 0 message fields can be used, but without the flag which conventionally differentiates between Format 0 and Format 1A.

Finally for the first example, for the case in which the bit value has the meaning that the resource allocation is for both devices 10-1, 10-2 for the cellular network (bit value 11 in the above table), then in an exemplary embodiment the eNB 12 sends two concatenated DCI Format 0 messages as noted above, one for each device 10-1, 10-2, and each has the conventional DCI Format 0 message fields but without the format-differentiating flag as noted above.

In a second example there is a one-bit explicit resource allocation indication, for which the binary values 0 and 1 have the different meanings that the resource allocation is for the D2D network or for a special resource allocation (of which all options for the special resource allocation have the resource being allocated for the cellular network).

Assuming bit value 0 means that the resource allocation is for the D2D network, then in an exemplary embodiment at least the following fields are included in the resource allocation message: resource block grant; allocation type (e.g., dynamic or persistent or semi-persistent), a power control command, and a request for the D2D devices 10-1, 10-2 to send aperiodic CQI reports about the D2D link. Note these are identical to those noted above for the first example in which the bit value was 00 and had a similar meaning.

Assuming bit value 1 means that the resource allocation is a special allocation, then in an exemplary embodiment at least a user discriminating bit is defined in a field following the explicit indicator it. The value of the user discriminating bit selects one D2D device, 10-1 or 10-2, to which the resource is allocated. In an exemplary embodiment the conventional LTE DCI Format 0 message fields can be used for the remainder of the DCI for the case in which the bit value means a special resource allocation, but without the flag which conventionally differentiates between DCI Format 0 and Format 1A. As noted above, in this case also the eNB 12 may in an exemplary embodiment send two concatenated DCI Format 0 messages, one for each device 10-1, 10-2, with a pre-defined pattern of padding bits between them to indicate there is a concatenated message following the padding bits, if in fact the eNB 12 sends different special resource allocations to the different D2D devices 10-1 and 10-2 in the same PDCCH.

Regardless of which explicit bit indicator is used, it is anticipated that still there might occur collisions between a bearer allocated for the D2D network and a bearer allocated for the cellular network. For example, there may be a persistent or semi-persistent allocation of a D2D bearer which the eNB 12 chooses to override/interrupt in order to schedule one or both of the D2D devices 10-1, 10-2 for cellular network traffic. In this case the eNB 12 would by example send a resource allocation addressed to the CD2D network C-RNTI with an explicit indication that the allocation is to the UE 10-1 and the allocated resource is a cellular bearer.

The eNB 12 is aware of the scheduling conflict/overlap since it is the eNB 12 itself which schedules the D2D and the cellular bearers and tracks in its local memory all the unexpired bearer allocations. The UE 10-1 becomes aware of the conflict when it reads the later-received allocation to it for the cellular bearer. The UE 10-1 uses its own determination that there is a conflict as an implicit indication that the bearer allocated for the D2D network is not to be utilized for the duration of the conflict, thereby giving inherent precedence to any allocated cellular bearers in all cases of scheduling (allocation) conflicts between D2D and cellular bearers.

It is possible that in the above conflict case the conflict will be partial rather than complete. For example, if the cellular radio bearer resources of one D2D device 10-1 are partially or totally different in frequency but overlap in time (i.e., different PRBs) as compared to the D2D radio bearer resources, the above resolution rules which give precedence to any allocated cellular bearers in the case of scheduling conflict may by example be implemented as follows.

- If there is sufficient separation in frequency (by example, as set forth via network signaling or some standardized parameter) between the conflicting allocated D2D and cellular bearers, the device 10-1 to which the cellular bearer is allocated may still send D2D data to the other device 10-2, such as via dual SC-FDMA transmissions (simultaneous cellular uplink transmission and D2D transmission).
- The device 10-1 to which the cellular bearer is allocated could use both the pre-existing allocated D2D resources and the newly allocated cellular resources for only its cellular uplink transmission.
- The pre-existing allocated D2D resources may be given to some other device 10-2 in that subframe or for the duration of the conflict.

The above bulleted options may be implemented separately or in combination, and via these rules which the other device 10-2 also stores in its memory the other device 10-2 is implicitly informed how it might use the colliding D2D allocation (in some of the above bullets) without the need for any explicit indication by the eNB 12 or the UE 10-1 about the assigned cellular link resources for the UE 10-1. This is because in an embodiment, for all cases of resource allocations to any of the D2D devices 10-1, 10-2, both the D2D and the cellular allocations are addressed to the D2D C-RNTI, and so even if the conflicting cellular bearer is not allocated to the other device 10-2 the other device 10-2 still reads it and knows of the scheduling collision at the same time as does the UE 10-1 which holds the cellular bearer allocation.

Figure 2:
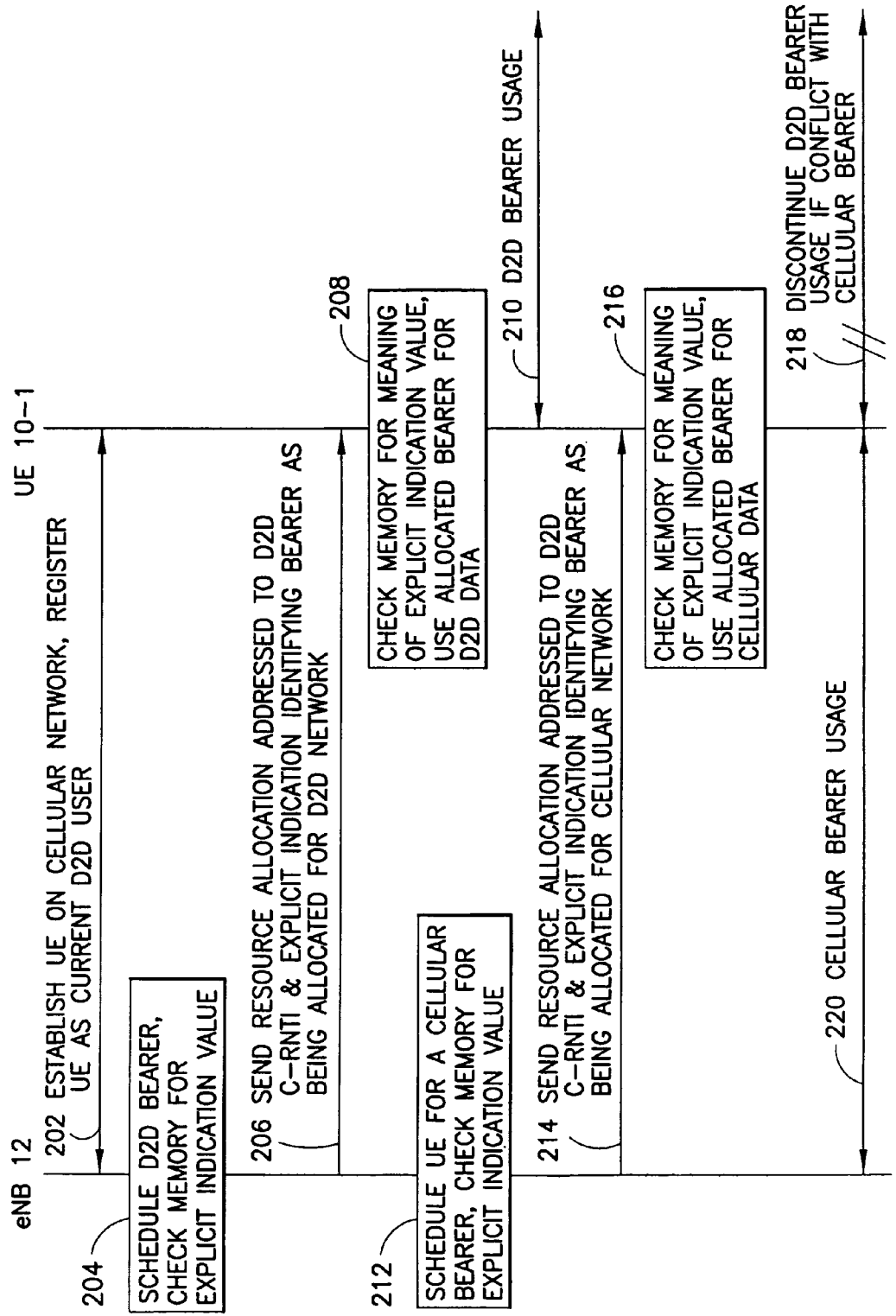
FIG. 2 is a signaling diagram illustrating exemplary embodiments of the invention in which the RNTI assigned to the D2D network is used for allocations of both cellular and D2D bearers.

FIG. 2 is an exemplary signaling diagram showing certain of the above embodiments in which the allocation messages for both cellular and the D2D bearers are addressed to the C-RNTI for the D2D network. The other device 10-2 is not shown but is understood to operate substantially similar to that shown for the UE 10-1, relevant to FIG. 2 at least. As an initial condition at message exchange 202 the UE 10-1 becomes established on the cellular network. The UE 10-1 also has an active connection with a D2D or other local network distinct from the cellular network, which the eNB 12 may learn via the UE 10-1 registering as a current/active D2D user.

At block 204 the eNB 12 schedules a D2D bearer for the D2D network of which the UE 10-1 is a member. The eNB 12 knows the meaning it wants to ascribe to this resource assignment (that it is for the D2D network), and checks its local memory for the appropriate value to set for the explicit indication. By example if using the above table for the two-bit indication the value would be 00. The eNB 12 sends a first resource allocation message 206 to the UE 10-1, and this message is addressed to the C-RNTI assigned to the D2D network, identifies specifically which resource is allocated, and carries the explicit indication which identifies that the allocated resource is for the D2D network. At block 208 the UE 10-1 checks its own local memory with the value for the explicit indication received in the message 206 and finds the meaning is that the bearer allocation is for the D2D network. At message exchange 210 the UE 10-1 utilizes the allocated bearer to exchange data with the other device 10-2 (not shown) operating on the D2D network.

Assume the first resource allocation at message 206 was semi-persistent. The eNB 12 then at block 212 schedules the UE 10-1 for a cellular bearer and checks its local memory to find the value for the two-bit explicit indication for a cellular bearer allocation to the UE 10-1. By the example table above this value is 01. The eNB 12 sends a second resource allocation message 214 to the UE 10-1, and this message is also addressed to the C-RNTI assigned to the D2D network, it identifies specifically which resource is allocated, and carries the explicit indication which identifies that the identified resource is allocated to the UE 10-1 and is for the cellular network. At block 216 the UE 10-1 checks its own local memory with the value for the explicit indication received in the message 214 and finds the meaning is that the bearer allocation is to the UE 10-1 and is for the cellular network. Assuming the cellular allocation from message 214 collides with the semi-persistent D2D allocation from message 206, the UE 10-1 determines there is a collision and uses that determination as an implicit indication to discontinue usage of the D2D bearer at 218, thereby giving precedence to the cellular bearer allocation from message 214 which the UE 10-1 utilizes at message 220 (UL or DL or both according to the allocation message 214).

According to different embodiments distinct from those detailed above, the cellular bearer allocations sent by the eNB 12 are addressed to the individual C-RNTIs associated with individual devices 10-1, 10-2 as opposed to the above examples in which the cellular allocations were addressed to the C-RNTI associated with the D2D network. The D2D bearer allocations are still addressed to the C-RNTI associated with the D2D network, and so both devices 10-1 and 10-2 are always aware of the D2D bearer assignments. In this case the scheduling flexibility of the eNB 12 is constrained somewhat in order to allow the portable devices 10-1, 10-2 a more efficient way to find their allocations. In this exemplary embodiment the eNB 12 locates all the aforementioned C-RNTIs (the separate cellular C-RNTIs assigned to the individual devices 10-1 and 10-2 as well as the D2D C-RNTI assigned to the D2D network as a whole) into the same search space. In this manner the search space which the user devices 10-1, 10-2 must search to see if any resources are allocated to them is not expanded as compared to conventional LTE, but the user devices 10-1, 10-2 simply have more than one C-RNTI to search for within that same-size search space.

In this regard it is preferable that the user devices 10-1, 10-2 be informed of one another's cellular C-RNTI, either via a D2D link or via the eNB 12 over a cellular link. In this manner each device 10-1, 10-2 can see if there are any conflicts with the D2D allocations and give precedence to the cellular allocations as above by declining to utilize the D2D allocated bearer(s) for the duration of any conflict with any cellular allocated bearer(s). By example, the eNB 12 may be constrained by a published wireless protocol or standard to locate the above referenced multiple C-RNTIs within the same search space.

Different wireless systems define their specific search spaces differently, so the following description for LTE is exemplary and not limiting to the broader teachings of the network access node clustering the temporary identifiers that are related to one another via a D2D network into one search space. In LTE the PDCCH carries the resource allocation (and other control information for a UE or D2D network) in a DCI message. One subframe may contain multiple PDCCHs, but each PDCCH is transmitted using one or more CCEs, each CCE corresponding to nine sets of four physical elements known as Resource Element Groups (REGs). Four QPSK symbols are mapped to each REG. LTE supports four PDCCH formats, summarized below.

| PDCCH format | # of CCEs | # of REGs | # of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Since in LTE the CCEs are numbered and used consecutively, to simplify the decoding process, a PDCCH with a format consisting of n CCEs may only start with a CCE number with a number of equal to a multiple of n. The number of CCEs used for transmission of a particular PDCCH is determined by the eNB according to the channel conditions. For example, if the PDCCH is intended for a UE with a good downlink channel (e.g. close to the eNB), then one CCE is likely to be sufficient. However, for a UE with a poor channel (e.g. near the cell border) then eight CCEs may be required in order to achieve sufficient robustness.

In LTE, for each UE there is only a limited set of CCE locations where a PDCCH may be placed, and this is considered the UE's search space. The search space3 size may be different for different DCI formats. Furthermore, to minimize the possibility of blocking (eNB having assigned some CCE locations the remaining ones are not in the search space of a particular UE), a UE-specific hopping sequence is applied to the starting positions of the dedicated search spaces.

So according to these embodiments, for the case in which there is a D2D network in operation within the cell, the network access node controlling the cell restricts its transmissions of all resource allocations for all devices which are members of the D2D network such that all the resource allocations in a given transmission time interval fall within one pre-defined search space. Specific for LTE, the pre-defined search space is given by the DCI format in which at least one of the allocations is sent, and allocations for cellular bearers granted to the individual D2D device(s) utilize the individual device's C-RNTI while at the same time allocations for D2D bearers granted in common to the D2D devices of the D2D network utilize the C-RNTI assigned for the D2D network. In this manner each D2D device can be aware of any and all cellular bearers allocated to its paired D2D device, and thereby avoid utilizing any D2D bearers in a manner that would interfere with the cellular bearer granted to the other D2D device. These exemplary embodiments may be implemented as a method, as actions resulting from execution of a computer program tangibly stored on a computer readable memory, and as an apparatus comprising a processor and a memory storing a program of computer instructions which together are configured to cause the apparatus to perform the above functions, either from the perspective of the eNB or of the UE.

Figure 3:
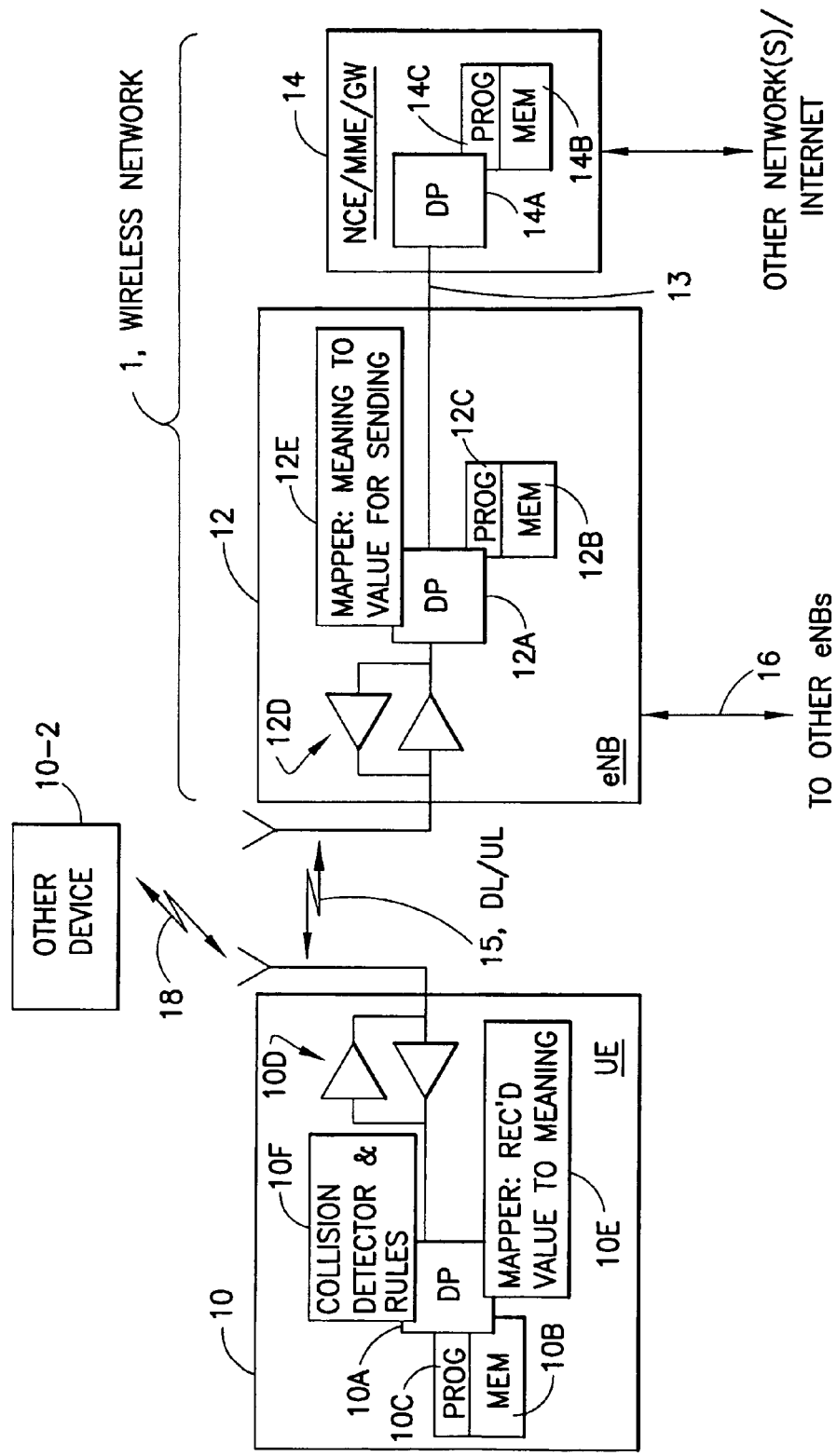
FIG. 3 is a simplified block diagram of various electronic devices that are suitable for use in practicing the exemplary embodiments of this invention.

Now are detailed at FIG. 3 a simplified block diagram of various electronic devices and apparatus that are suitable for use in practicing the exemplary embodiments of this invention. In FIG. 3 a wireless cellular network 1 is adapted for communication over a bi-directional wireless link 15 (DL/UL) with various user mobile apparatus via a network access node such as a Node B (base station), and more specifically an eNB 12. The cellular network 1 may include a network control element (NCE), also referred to as a MME and/or gateway GW 14, which provides connectivity with a further network such as a publicly switched telephone network and/or a data communications network (e.g., the internet) as noted with respect to FIG. 1. The UE 10-1 of FIG. 3 is shown in some detail, having D2D links 18 with another device 10-2 which may also be a second UE and constructed similar as the said UE 10-1.

The UE 10-1 includes a controller, such as a computer or a data processor (DP) 10A, a computer-readable memory medium embodied as a non-transient memory (MEM) 10B that stores a program of computer instructions or computer program code (PROG) 10C, and a suitable radio frequency (RF) transmitter and receiver 10D for bidirectional wireless communications with the eNB 12 via one or more antennas (one shown). The eNB 12 also includes a controller, such as a computer or a data processor (DP) 12A, a computer-readable memory medium embodied as a non-transient memory (MEM) 12B that stores a program of computer instructions or computer program code (PROG) 12C, and a suitable RF transmitter and receiver 12D for communication with the UE 10-1 via one or more antennas (one shown). The eNB 12 is coupled via a data/control path 13 such as an S1 interface to the NCE 14. The eNB 12 may also be coupled to another eNB via data/control path 16, which may be implemented as an X2 interface.

At least one of the PROGs 10C and 12C is assumed to include program instructions that, when executed by the associated DP, enable the device 10-1, 10-2, 12 to operate in accordance with the exemplary embodiments of this invention, as detailed above. That is, the exemplary embodiments of this invention may be implemented at least in part by computer software or computer program code stored on the node's local memory 10B, 12B (which may be one or more distinct memory units) and executable by the node's own (one or more) DP 10A, 12A, or by hardware, or by a combination of software and hardware (and firmware).

For the purposes of describing the exemplary embodiments of this invention the UE 10-1 may be assumed to also include a mapper or mapping component 10E which maps from a bit value of a received explicit indication to a meaning for that value, and also a collision detector 10F which determines if there is a scheduling conflict among D2D and cellular bearers and applies a stored set of collision rules for controlling UE 10-1 behavior for each case that such a scheduling collision is determined to exist. At the eNB 12 there is also a mapper or mapping component 12E but in this instance the mapping is in reverse; the mapper 12E at the eNB 12 enters the table stored in the memory 12B with the meaning for the scheduled resource and from that table finds a value for the implicit indication, which the eNB 12 places in its resource allocation message prior to transmitting that message to the UE 10-1.

In general, the various embodiments of the UEs 10-1, 10-2 may include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 4:
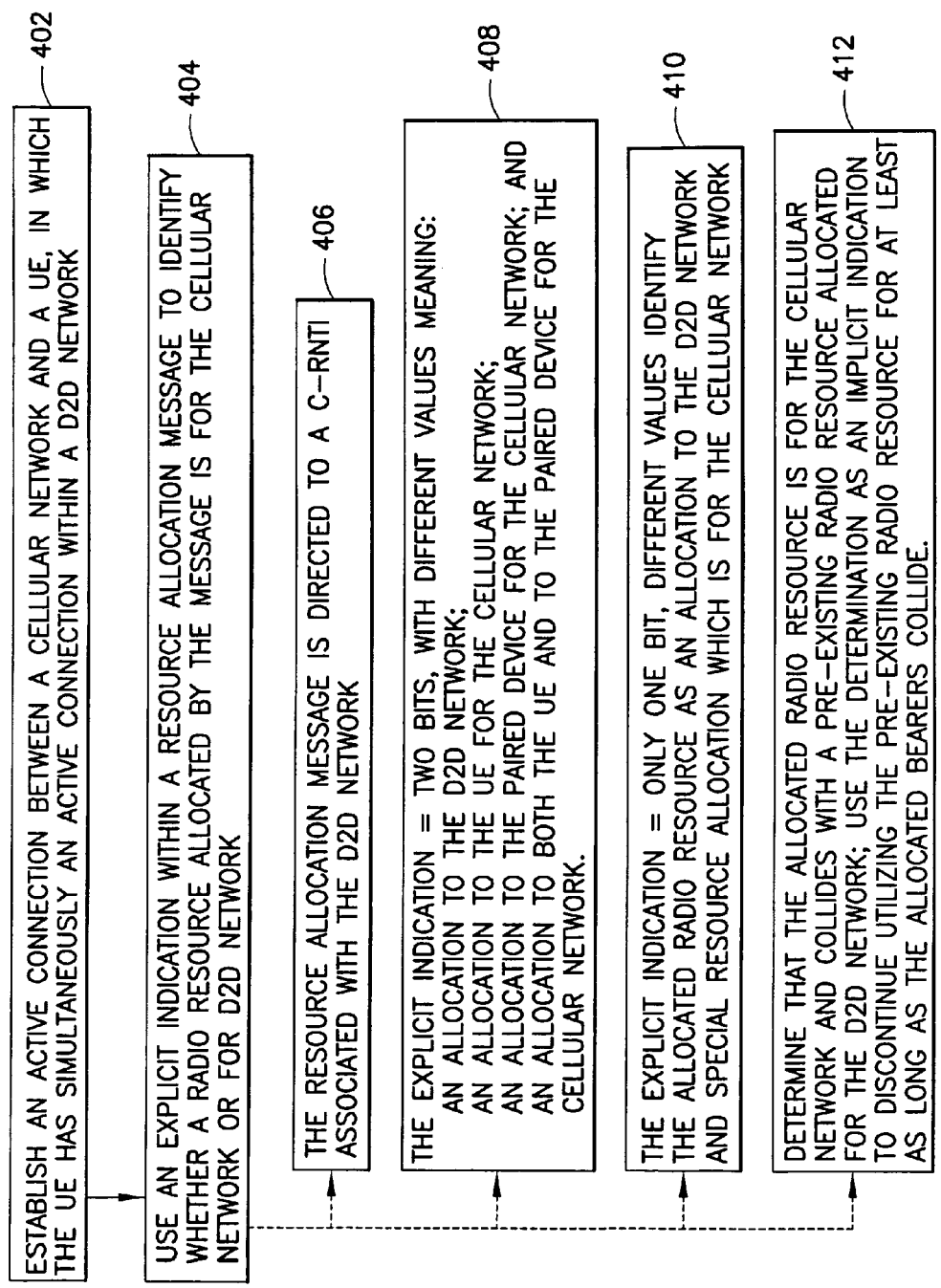
FIG. 4 is a logic flow diagram illustrating the operation of a method, and a result of execution of computer program instructions tangibly embodied on a computer readable memory, and actions performed by an apparatus configured according to exemplary embodiments of the invention.

FIG. 4 is a logic flow diagram that illustrates, in accordance with various exemplary embodiments of the invention, the operation of a method, and a result of execution of computer program instructions or computer program code embodied on a computer readable memory, and an apparatus controlled by a processor running computer instructions stored on a memory. FIG. 4 illustrates generically and so it reads from the perspective of the UE 10-1 as well as the eNB 12.

At block 402 there is an active connection established between a cellular network and a UE, in which the UE has simultaneously an active connection within a local network distinct from the cellular network. By example the local network is a D2D network. At block 404 the eNB 12 and/or the UE 10-1 use an explicit indication within a resource allocation message to identify whether a radio resource allocated by the resource allocation message is for the cellular network or for the local network. From the eNB 12 perspective it sets the explicit indication to identify whether the allocated radio resource is for the cellular network or for the local network and it is the eNB 12 which sends the resource allocation message to the UE. From the UE 10-1 perspective the UE receives the resource allocation message from the eNB 12 and reads the explicit indication to identify whether the allocated radio resource is for the cellular network or for the local network.

Further portions of FIG. 4 are optional. At block 406 the resource allocation message is directed to a temporary identifier (e.g., a C-RNTI using LTE terminology) associated with the local network.

Block 408 describes the two-bit example above for the explicit indication. Different values of the explicit indication of block 404 have different meanings to identify the allocated radio resource according to at least three of the allocations listed at block 408 and which are also listed at the table that is provided above with the first example. In one embodiment the value of the two-bit indication in the resource allocation message of block 404 identifies the resource allocation according to at least one of those listed at block 408. Block 410 describes the only one-bit example for the explicit indication, and different values of the explicit indication identify the allocated radio resource as an allocation to the D2D network and a special resource allocation which is for the cellular network.

For the collision teachings above the UE 10-1 implements the collision rules on its own accord. In this respect at block 412 the explicit indication of block 404 identifies the allocated radio resource allocated as being for the cellular network, and block 412 continues in that the UE determines that the allocated radio resource collides with a pre-existing radio resource allocated for the D2D network, and uses the determination as an implicit indication to discontinue utilizing the pre-existing radio resource (allocated for the D2D network) for at least as long as the pre-existing radio resource for the D2D network would collide with the allocated radio resource for the cellular network. Above are given more detailed rules for implementing this collision avoidance for various conditions of the scheduling collision.

The process elements set forth at FIG. 2 or 4 may be embodied as a memory storing a program of computer readable instructions that when executed by at least one processor result in the actions set forth at FIGS. 2 and/or 4. In another embodiment an apparatus comprises at least one processor and at least one memory storing computer program code; in which the at least one memory and the computer program code are configured with the at least one processor to cause the apparatus at least to perform the elements set forth at FIGS. 2 and/or 4.

In a still further embodiment there is an apparatus comprising storing means for storing different values for an explicit indication each associated with a different meaning for a resource allocation; and the apparatus further comprising mapping means for identifying, with reference to the storing means and to a specific value of an explicit indication within a resource allocation message, whether a radio resource allocated by the resource allocation message is for a cellular network or for a local network distinct from the cellular network. By example, the storing means may be any of the MEMs 10B, 12B detailed above with reference to FIG. 3, and the mapping means may be the mappers/mapping components 10E, 12E detailed at FIG. 4 as implemented within a DP 10A, 12A detailed with respect to FIG. 3, or a special purpose integrated circuit (e.g., ASIC), or a combination of software instructions embodied on a memory 10B, 12B with a DP 10A, 12A.

In general, the various exemplary embodiments may be implemented in hardware or special purpose circuits, software stored on a non-transient memory, logic or any combination thereof. For example, some aspects may be implemented in hardware, while other aspects may be implemented in firmware/software stored on a non-transient memory and which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

The various steps and blocks shown in FIG. 2 or 4 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. A method comprising:
   establishing an active connection between a cellular network and a user equipment, wherein the user equipment has simultaneously an active connection within a local network distinct from the cellular network; and
   using an indication within a resource allocation message communicated between the cellular network and the user equipment to identify whether a radio resource allocated by the resource allocation message is for the cellular network or for the local network,
   wherein the local network is a device-to-device network comprising at least the user equipment and a paired device and the indication comprises at least two bits, and wherein a value of the indication identifies the allocated radio resource according to at least one of the following allocations:
   an allocation to the device-to-device network;
   an allocation to the user equipment for the cellular network;
   an allocation to the paired device for the cellular network; and
   an allocation to both the user equipment and to the paired device for the cellular network.

2. The method according to claim 1, wherein the resource allocation message is directed to a temporary identifier associated with the local network and the resource allocation message is communicated wirelessly from the cellular network to each member of the local network.

3. The method according to claim 1, wherein the method is executed by the user equipment which receives the resource allocation message from an access node of the cellular network and which reads the indication to identify whether the allocated radio resource is for the cellular network or for the local network.

4. The method according to claim 3, wherein the indication identifies the allocated radio resource allocated as being for the cellular network; the method further comprising:
   the user equipment determining that the allocated radio resource collides with a pre-existing radio resource allocated for the local network, and using the determination as an implicit indication to discontinue utilizing the pre-existing radio resource for at least as long as the pre-existing radio resource for the local network would collide with the allocated radio resource for the cellular network.

5. The method according to claim 1, wherein the method is executed by an access node of the cellular network which sets the indication to identify whether the allocated radio resource is for the cellular network or for the local network and which sends the resource allocation message to the user equipment.

6. An apparatus comprising:
   at least one processor; and
   at least one memory storing computer program code, the at least one memory and the computer program code configured, with the at least one processor, to cause the apparatus at least to:
   establish an active connection between a cellular network and a user equipment, wherein the user equipment has simultaneously an active connection within a local network distinct from the cellular network; and
   use an indication within a resource allocation message communicated between the cellular network and the user equipment to identify whether a radio resource allocated by the resource allocation message is for the cellular network or for the local network,
   wherein the local network is a device-to-device network comprising at least the user equipment and a paired device and the indication comprises at least two bits; and wherein the at least one memory and the computer program code are configured with the at least one processor to cause the apparatus to use a value of the indication to identify the allocated radio resource according to at least one of the following allocations associated in the at least one memory with the value of the indication:
   an allocation to the device-to-device network;
   an allocation to the user equipment for the cellular network;
   an allocation to the paired device for the cellular network; and
   an allocation to both the user equipment and to the paired device for the cellular network.

7. The apparatus according to claim 6, wherein the resource allocation message is directed to a temporary identifier associated with the local network and the resource allocation message is communicated wirelessly from the cellular network to each member of the local network.

8. The apparatus according to claim 6, wherein the apparatus comprises the user equipment, or one or more components thereof, which receives the resource allocation message from an access node of the cellular network; wherein the processor and the at least one memory and the computer program code are configured to cause the apparatus to read the indication to identify whether the allocated radio resource is for the cellular network or for the local network.

9. The apparatus according to claim 8, wherein the indication identifies the allocated radio resource allocated as being for the cellular network; and in which the at least one memory and the computer program code are configured with the at least one processor to cause the apparatus to at least further:
   determine that the allocated radio resource collides with a pre-existing radio resource allocated for the local network, and use the determination as an implicit indication to discontinue utilizing the pre-existing radio resource for at least as long as the pre-existing radio resource for the local network would collide with the allocated radio resource for the cellular network.

10. The apparatus according to claim 6, wherein the apparatus comprises an access node of the cellular network, or one or more components thereof, wherein the processor and the at least one memory and the computer program code are configured to cause the apparatus to set the indication to identify whether the allocated radio resource is for the cellular network or for the local network and to send the resource allocation message to the user equipment.

11. A computer program product comprising a non-transitory computer-readable medium bearing computer program code embodied therein for use with at least one processor, the computer program code comprising:
    code for establishing an active connection between a cellular network and a user equipment, wherein the user equipment has simultaneously an active connection within a local network distinct from the cellular network; and
    code for using an indication within a resource allocation message communicated between the cellular network and the user equipment to identify whether a radio resource allocated by the resource allocation message is for the cellular network or for the local network,
    wherein the local network is a device-to-device network comprising at least the user equipment and a paired device and the indication comprises at least two bits; and wherein a value of the indication identifies the allocated radio resource according to at least one of the following allocations:
    an allocation to the device-to-device network;
    an allocation to the user equipment for the cellular network;
    an allocation to the paired device for the cellular network; and
    an allocation to both the user equipment and to the paired device for the cellular network.

12. The computer program product according to claim 11, wherein the resource allocation message is directed to a temporary identifier associated with the local network and the resource allocation message is communicated wirelessly from the cellular network to each member of the local network.

13. The computer program product according to claim 11, wherein the computer-readable memory and the at least one processor are disposed within the user equipment which receives the resource allocation message from an access node of the cellular network and which reads the indication to identify whether the allocated radio resource is for the cellular network or for the local network.

14. The computer program product according to claim 11, wherein the computer-readable memory and the at least one processor are disposed within the an access node of the cellular network which sets the indication to identify whether the allocated radio resource is for the cellular network or for the local network and which sends the resource allocation message to the user equipment.

15. An apparatus comprising:
    at least one processor; and
    at least one memory storing computer program code, the at least one memory and the computer program code configured, with the at least one processor, to cause the apparatus at least to:
    establish an active connection between a cellular network and a user equipment, wherein the user equipment has simultaneously an active connection within a local network distinct from the cellular network; and
    use an indication within a resource allocation message communicated between the cellular network and the user equipment to identify whether a radio resource allocated by the resource allocation message is for the cellular network or for the local network,
    wherein the local network is a device-to-device network comprising at least the user equipment and a paired device and the indication comprises only one bit, and wherein different values of the indication identify the allocated radio resource as an allocation to the device-to-device network and a special resource allocation which is for the cellular network.

16. An apparatus comprising:
    at least one processor; and
    at least one memory storing computer program code, the at least one memory and the computer program code configured, with the at least one processor, to cause the apparatus at least to:
    establish an active connection between a cellular network and a user equipment, wherein the user equipment has simultaneously an active connection within a local network distinct from the cellular network; and
    use an indication within a resource allocation message communicated between the cellular network and the user equipment to identify whether a radio resource allocated by the resource allocation message is for the cellular network or for the local network,
    wherein the apparatus comprises the user equipment, or one or more components thereof, which receives the resource allocation message from an access node of the cellular network; wherein the processor and the at least one memory and the computer program code are configured to cause the apparatus to read the indication to identify whether the allocated radio resource is for the cellular network or for the local network, and
    wherein the indication identifies the allocated radio resource allocated as being for the cellular network; and in which the at least one memory and the computer program code are configured with the at least one processor to cause the apparatus to at least further:
    determine that the allocated radio resource collides with a pre-existing radio resource allocated for the local network, and use the determination as an implicit indication to discontinue utilizing the pre-existing radio resource for at least as long as the pre-existing radio resource for the local network would collide with the allocated radio resource for the cellular network.

* * * * *